United States Patent
Ichikawa

(10) Patent No.: US 7,764,422 B2
(45) Date of Patent: Jul. 27, 2010

(54) THZ WAVE GENERATION DEVICE

(75) Inventor: Junichiro Ichikawa, Chiyoda-ku (JP)

(73) Assignee: Sumitomo Osaka Cement Co., Ltd., Tokyo (JP)

( * ) Notice: Subject to any disclaimer, the term of this patent is extended or adjusted under 35 U.S.C. 154(b) by 0 days.

(21) Appl. No.: 11/992,801

(22) PCT Filed: Sep. 27, 2006

(86) PCT No.: PCT/JP2006/319108

§ 371 (c)(1),
(2), (4) Date: Nov. 21, 2008

(87) PCT Pub. No.: WO2007/037243

PCT Pub. Date: Apr. 5, 2007

(65) Prior Publication Data

US 2009/0153948 A1    Jun. 18, 2009

(30) Foreign Application Priority Data

Sep. 29, 2005    (JP) .............................. 2005-285559

(51) Int. Cl.
G02F 1/355    (2006.01)
H01S 3/11    (2006.01)
H01S 3/16    (2006.01)

(52) U.S. Cl. ................... 359/330; 359/326; 359/341.5; 359/349

(58) Field of Classification Search ......... 359/326–332, 359/341.5, 349
See application file for complete search history.

(56) References Cited

U.S. PATENT DOCUMENTS

| 6,014,249 | A | * | 1/2000 | Fermann et al. ........... 359/341.1 |
| 6,529,314 | B1 | | 3/2003 | Shukunami et al. |
| 6,697,186 | B2 | | 2/2004 | Kawase et al. |
| 7,221,451 | B2 | * | 5/2007 | Ohtake et al. ............... 356/326 |

(Continued)

FOREIGN PATENT DOCUMENTS

JP    2000-066253 A    3/2000

(Continued)

OTHER PUBLICATIONS

Alferness, R.C., et al., Electro-Optic Waveguide TE-TM Mode Converter with Low Drive Voltage, Optics Letters, vol. 5, No. 11, Nov. 1980, pp. 473-475.

(Continued)

Primary Examiner—Daniel Petkovsek
(74) Attorney, Agent, or Firm—Chapman and Cutler LLP

(57) ABSTRACT

In a THz wave generator for generating a THz wave from a THz wave generating element by inputting a plurality of laser beams having different wavelengths to the THz wave generating element, all of the plurality of laser beams are formed into a pulse beam by the pulse generator and the pulse beam is amplified by a single optical amplifier E to which the laser beams are inputted with polarization planes of the laser beams being controlled, and then the pulse beam is inputted to the THz wave generating element F. Preferably, the plurality of laser beams having different wavelengths are generated by inputting single wavelength beam to a multi wavelength generator from single mode laser light source and by inputting light waves having a plurality of wavelengths generated from the multi wavelength generator to wavelength selecting means.

16 Claims, 5 Drawing Sheets

U.S. PATENT DOCUMENTS

| | | | |
|---|---|---|---|
| 7,400,660 B2 * | 7/2008 | Wada et al. | 372/32 |
| 2002/0027698 A1 | 3/2002 | Kawanishi | |
| 2005/0242287 A1 * | 11/2005 | Hakimi | 250/363.09 |
| 2009/0052013 A1 | 2/2009 | Higuma et al. | |

FOREIGN PATENT DOCUMENTS

| | | |
|---|---|---|
| JP | 2001-249367 A | 9/2001 |
| JP | 2002-072269 A | 3/2002 |
| JP | 3404528 B2 | 5/2003 |
| JP | 2005-077470 A | 3/2005 |
| WO | WO 2005/098530 A1 | 10/2005 |

OTHER PUBLICATIONS

Furuta, H., et al., Optical Injection Locking of a 38-GHz-Band InP-Base HEMT Oscillator Using a 1.55-mm DSB-SC Modulated Lightwave, IEEE Microwave and Wirelesss Components Letters, vol. 11, No. 1, Jan. 2001, pp. 19-21.

Higuma, K., et al., X-cut LiNbO3 Optical SSB-SC Modulator, Technical Report 2002, Sumitoma Osaka Cement Co., Ltd., Dec. 8, 2001. pp. 17-21.

Takada. A., et al., Wavelength Converter Operating on Strict Frequency Grid Using a Single Side Band Optical Modulator in a Circulating Loop. Technical Digest, Optical Fiber Communication Conference 2003, vol. 2, pp. 769-770.

Powers, P.E., et al., Teraherz Generation with Tandem Seeded Optical Parametric Generators, Optics Letters, vol. 30, No. 6, Mar. 15, 2005, pp. 640-642.

Higuma, K., et al., Wavelength dependence of a High Extinction-Ratio LN Modulator Using an Optical FSK Modulator, The Institute of Electronics, Information and Communication Engineers, Society Convention 2005, C-3-2.

* cited by examiner

[FIG.1]
(a) Prior Art
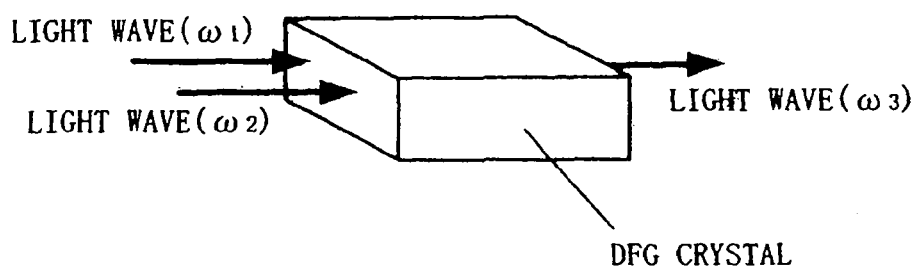
(b) Prior Art
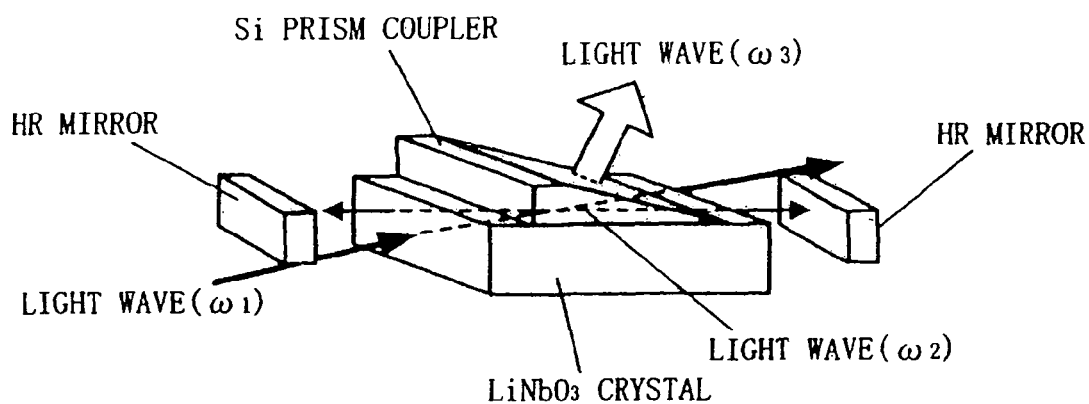
[FIG.2]
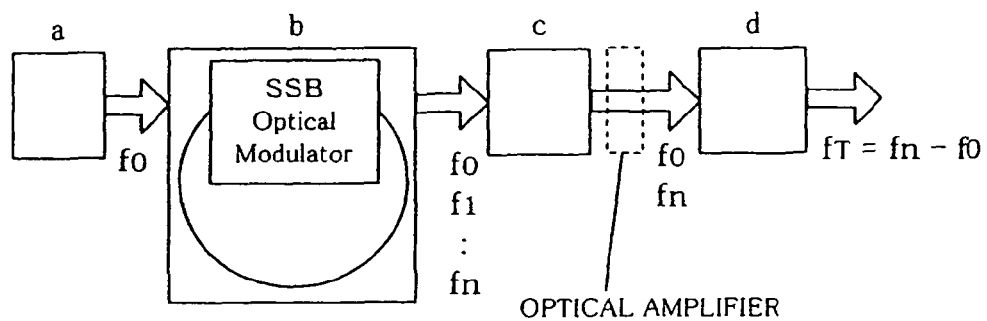

[FIG.3]
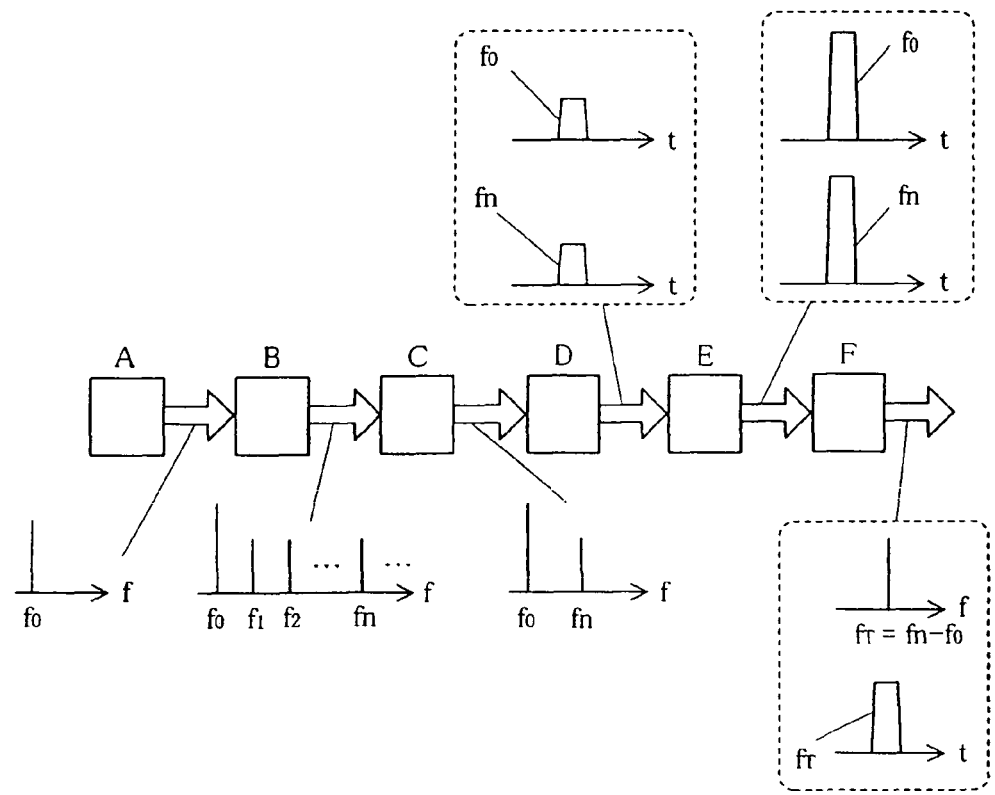
[FIG.4]
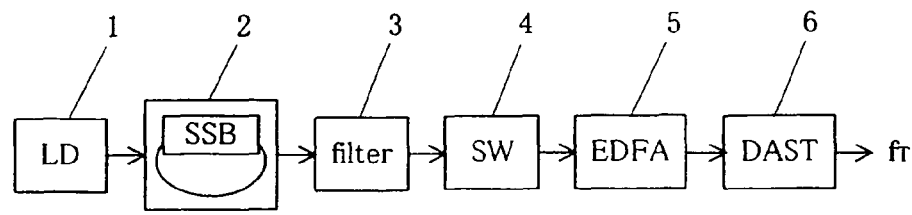

[FIG.5]
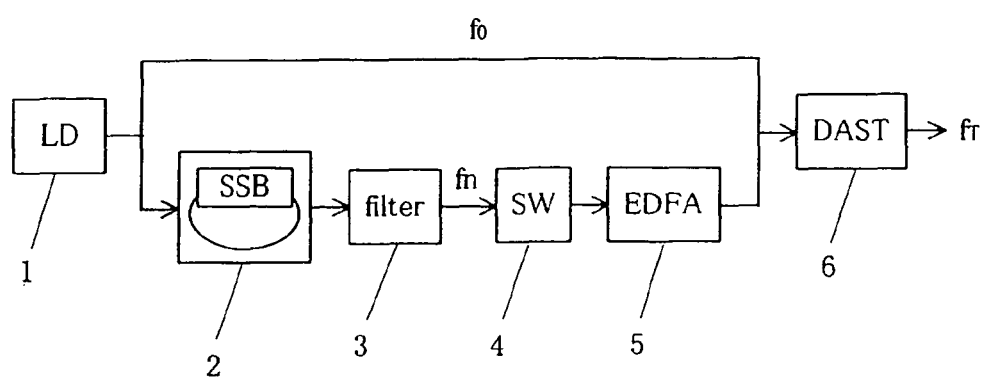
[FIG.6]
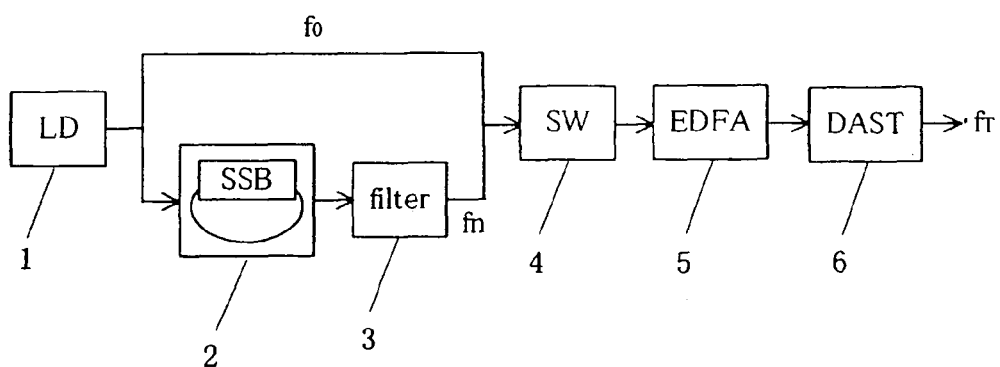

[FIG.7]
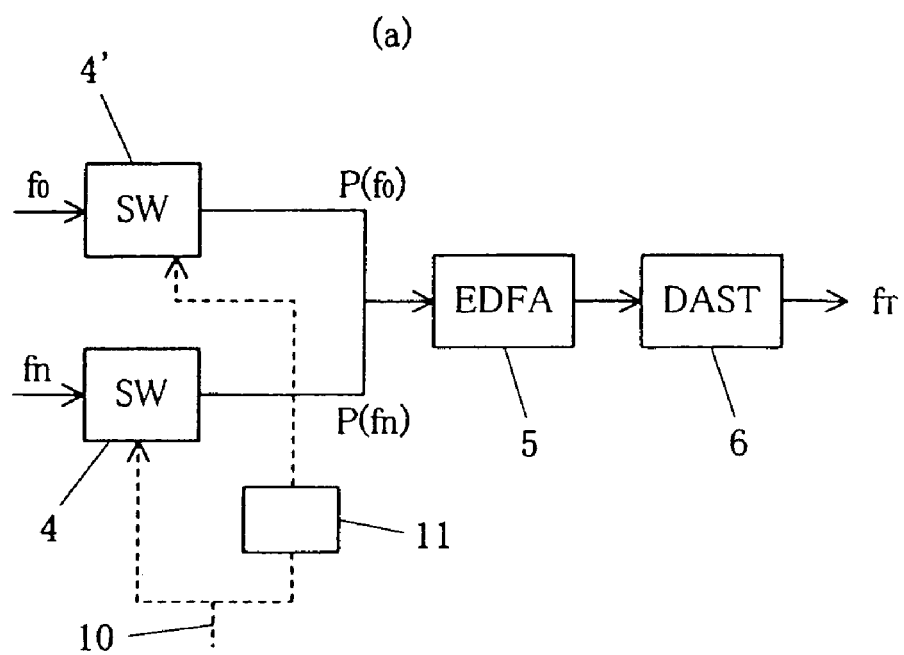
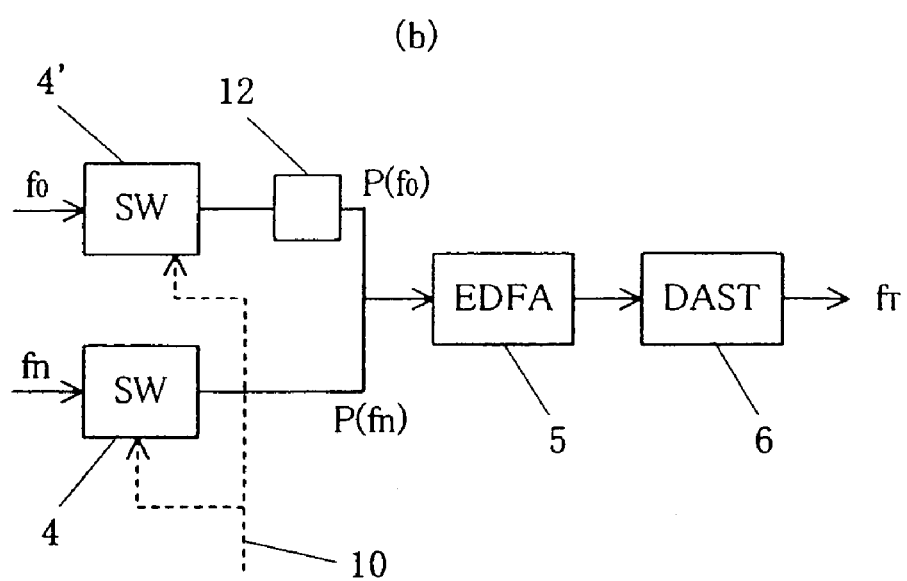

[FIG.8]
(a)
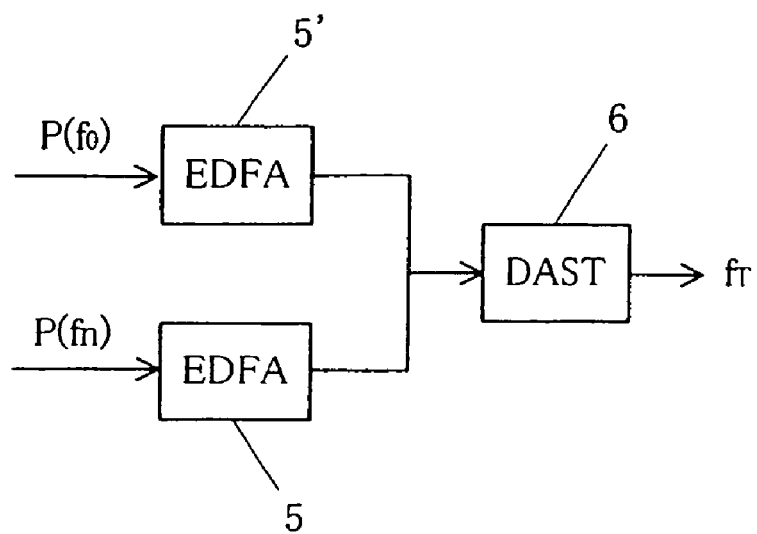
(b)
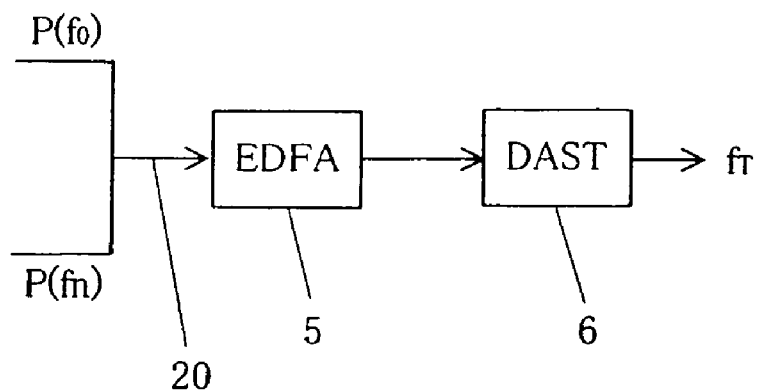

THZ WAVE GENERATION DEVICE

TECHNICAL FIELD

The present invention relates to a THz (tera-hertz) wave generator, and more particularly, to a THz wave generator which generates a THz wave by inputting a laser beam from a light source including a laser light source to a THz wave generating element.

BACKGROUND ART

A THz (tera-hertz) wave is an infrared ray having a wavelength of 30 µm to 300 µm and an ultra-high frequency electromagnetic wave having a frequency 1 THz or more.

The THz wave is expected to be widely used in the fields of basic science, engineering, and medicine-biology. For example, in the field of basic science, the THz wave is used in a structure elucidation of physical and chemical materials using a spectroscopy, a discovery of interstellar materials by radio wave frequency and infrared astronomy and spectroscopy science, and the like. In the field of engineering, the THz wave is used in a THz wave ultra-high-speed communication (cosmic space communication and the like), a geo-environmental sensing (a detection of various gases and environmental materials and the like), an assessment of a free electron density and mobility of a semiconductor material, an assessment of an dielectric characteristic of a dielectric functional material, a cubic structure assessment of a organic functional polymer, and internal check of an electronic package. In the field of medicine-biology, the THz wave is used in analysis in a structure of biological functional protein, an imaging of functions of body tissues, and the analysis of a structure of a medication (opaque powder base).

As a method of generating a THz wave, a method using difference frequency generation (DFG) shown in FIG. 1($a$) or a method using a parametric oscillation shown in FIG. 1($b$) is known.

In the method using the difference frequency generation, by using nonlinear optical crystals (also referred to as a DFG crystals) formed of $LiNbO_3$, GaAs, organic DAST 4-dimethylamino-N-metyl-4-stilbazolium tosylate), and the like as a THz wave generation element, two light waves having different frequencies are inputted to the THz wave generating element to generate the THz wave by using a difference frequency wave which is a difference in frequency between the two light waves.

In this difference frequency generation method, two light sources having different frequencies ($\omega_1$, $\omega_2$) are required and it is necessary to keep a difference in a frequency between both light sources constant in order to stably generate a THz wave ($\omega_3 = \omega_2 - \omega_1$). Therefore, frequencies (wavelengths) of the light waves generated from the two light sources needs to be maintained and controlled in predetermined values with high precision.

Even if the frequency of the THz wave varies by setting one of the two light sources as a wavelength variable light source, a variation precision of the frequency of a wavelength-variable light source is approximately 1 GHz. Accordingly, the frequency control of the THz wave is limited.

Meanwhile, in the method using the parametric oscillation, as disclosed in Patent Document 1 below, the nonlinear optical crystals as the THz wave generating element is disposed in a resonator and one light wave having a predetermined frequency ($\omega_1$) is inputted to the THz wave generating element, thereby, the THz wave ($\omega_3$, $\omega_1 = \omega_2 + \omega_3$) corresponding to a difference between the frequency of an incident light wave and a resonance frequency ($\omega_2$) in the resonator by a parametric effect is generated.

[Patent Document 1] Japanese Unexamined Patent Application No. 2002-72269

In this parametric oscillation method, it is advantageous that only one light source is required in comparison with the difference frequency generating method, but the frequency (wavelength) of the light wave generated from the light source still needs to be maintained and controlled in the predetermined value with high precision.

Since resonance efficiency of the resonator needs to be maintained high, a location and a shape of a reflective member (HR mirror) constituting the resonator should be maintained and controlled with high precision.

The present applicant proposed a THz wave generator which stably and efficiently generates a THz wave, and particularly, which is stable with a variation in frequency of a laser light source and can easily vary the frequencies of the THz waves, as described in Patent Document 2 to solve the problem.

[Patent Document 2] PCT/JP2005/5327 (Date of Application: Mar. 31, 2005)

In Patent Document 2, as shown FIG. 2, in a THz wave generator inputting a laser beam from a light source unit (a) including a laser light source to a THz wave generating element (d) and generating a THz wave ($f_T$) from the THz wave generating element, a light circulating unit (b) including an SSB optical modulator and wavelength selecting means (c) are disposed between the laser source unit a and the THz wave generating element (d), the laser beam is inputted to the light circulating unit, a particular wavelength ($f_0$, $f_n$) is selected out of light waves having a plurality of wavelengths ($f_0$, $f_1$ ... $f_n$ ... ) generated from the light circulating unit by the wavelength selecting means, and the light wave with the particular wavelength is inputted to the THz wave generating element.

In order to raise the optical power of the THz wave, the optical power of the laser beam inputted to the THz wave generating element is raised by forming an optical amplifier prior to the THz wave generating element (d).

However, when the power of the laser beam is amplified up to 10 mW to several W by the optical amplifier, the power of the THz wave is only several nW and there is problem that the optical amplifier has increase in expense and increase in size to gain the higher power.

DISCLOSURE OF THE INVENTION

Problems to be Solved by the Invention

The present invention is contrived to solve the above-mentioned problems. An object of the invention is to provide a THz wave generator which can suppress the increase in manufacturing cost and the increase in size of the entire apparatus and efficiently generate the several-W class THz wave.

Means for Solving the Problems

To achieve the above-mentioned object, according to a first aspect of the invention, there is provided a THz wave generator for generating a THz wave from a THz wave generating element by inputting a plurality of laser beams having different wavelengths to the THz wave generating element, wherein at least one laser beam among the plurality of laser beams is a pulse beam and the pulse beam is amplified by an optical amplifier and then the pulse beam is inputted to the THz wave generating element.

Examples of a method of generating "a plurality of laser beams having different wavelengths" can include various methods such as a method using a plurality of laser light sources, a method of generating a laser beam with multi waves from one laser light source, a method of generating a plurality of wavelengths by inputting a beam from single mode laser light source to a multi wavelength generator described below, and furthermore, a method of generating different wavelengths from one divided beam by a wavelength modulator (or combination of a multi wavelength generator and wavelength selecting means) by dividing a beam from single mode laser light source.

According to a second aspect of the invention, in the THz wave generator according to the first aspect, the plurality of laser beams having different wavelengths are generated by inputting single wavelength beam from single mode laser light source to a multi wavelength generator and by inputting light waves having a plurality of wavelengths generated from the multi wavelength generator to wavelength selecting means.

According to a third aspect of the invention, in the THz wave generator according to the second aspect, the multi wavelength generator uses any one of a light circulating unit including an SSB optical modulator, a reciprocating multiple modulator, and a DSB-SC modulator.

According to a fourth aspect of the invention, in the THz wave generator according to any one of the first to third aspects, the pulse beam is generated by a pulse generator including any one of an optical switch and an optical modulator.

According to a fifth aspect of the invention, in the THz wave generator according to the fourth aspect, the pulse generator has single pulse generating means to which a plurality of coupled laser beams are inputted.

According to a sixth aspect of the invention, in the THz wave generator according to the fourth aspect, the pulse generator has a plurality of pulse generating means corresponding to the laser beams and phase controlling means for controlling phases of the pulse beams generated by the pulse generating means.

According to a seventh aspect of the invention, in the THz wave generator according to the sixth aspect, the phase controlling means is any one of a delay circuit of an electric signal applied to the plurality of the pulse generating means and light path controlling means formed in a light path of the pulse beam generated by the pulse generating means.

According to an eighth aspect of the invention, in the THz wave generator according to any one of the first to seventh aspects, all the plurality of laser beams are formed into the pulse beam and are inputted to single optical amplifier.

According to a ninth aspect of the invention, in the THz wave generator according to the eighth aspect, the plurality of laser beams are inputted to the optical amplifier with a polarization plane of the laser beam been controlled.

According to a tenth aspect of the invention, in the THz wave generator according to any one of the first to ninth aspects, the optical amplifier is an erbium-doped fiber amplifier.

According to an eleventh aspect of the invention, in the THz wave generator according to the tenth aspect, the optical amplifier is a polarization-plane-maintaining erbium-doped fiber amplifier.

According to a twelfth aspect of the invention, in the THz wave generator according to any one of the first to eleventh aspects, the THz wave generating element uses DAST crystals.

According to a thirteenth aspect of the invention, in the THz wave generator according to any one of the first to twelfth aspects, the wavelength of the laser beam formed into the pulse beam is in the range of 1.55 μm.

According to a fourteenth aspect of the invention, in the THz wave generator according to any one of the first to thirteenth aspects, the pulse width of the pulse beam is 20 ns or less.

According to a fifteenth aspect of the invention, in the THz wave generator according to any one of the first to fourteenth aspects, light intensity inputted to the optical amplifier at the time of extinguishing the pulse beam is −20 dBm or less.

According to a sixteenth aspect of the invention, in the THz wave generating apparatus according to any one of Claims the first to fifteenth aspects, a generating frequency of the pulse beam is 100 kp/s or less.

ADVANTAGES OF THE INVENTION

According to the first aspect of the invention, in a THz wave generator for generating a THz wave from a THz wave generating element by inputting a plurality of laser beams having different wavelengths to the THz wave generating element, at least one laser beam among the plurality of laser beams is a pulse beam, after amplifying the pulse beam by an optical amplifier, the pulse beam is inputted to the THz wave generating element, accordingly, the optical amplifier for the pulse beam which has high amplification characteristic and is inexpensive and compact in comparison with the optical amplifier amplifying constant beams, can be used, as a result, the very high-power THz wave generator restricting increase in manufacturing cost and large size of the entire apparatus can be provided.

According to the second aspect of the invention, since the plurality of laser beams having different wavelengths are generated by inputting single wavelength beam from single mode laser light source to a multi wavelength generator and by inputting light waves having a plurality of wavelengths generated from the multi wavelength generator to wavelength selecting means, the plurality of laser beams having different wavelengths with small change of wavelengths can be provided. In addition, since the plurality of wavelength beam are generated from single laser beam, it is easy to maintain the wavelength difference (frequency difference) among the wavelengths in a predetermined value, since frequency of the THz wave which is generated by the frequency difference of the laser beams inputted to the THz wave generating element is determined, the THz wave with a very stable wavelength can be generated.

Further, since it is possible to output separately the light wave with separating the light wave having a necessary wavelength among the light wave with a plurality of wavelengths by the wavelength selecting means, the wavelength of the THz wave can be easily changed and controlled.

According to the third aspect of the invention, since the multi wavelength generator uses any one of a light circulating unit including an SSB optical modulator, a reciprocating multiple modulator, and a DSB-SC modulator, the constant beam with a plurality of wavelength having intervals of predetermined frequency or the predetermined wave precisely controlled can be generated. In addition, since this multi wavelength generator can output a plurality of laser beams having the different wavelengths from a same outgoing portion, it is unnecessary to couple the plurality of laser beams, the entire of the THz wave generator can be compact.

According to the fourth aspect of the invention, since the pulse beam is generated by a pulse generator including any one of an optical switch and an optical modulator, a high-speed and stable pulse beam suitable for the optical amplifier can be generated.

According to the fifth aspect of the invention, since the pulse generator has single pulse generating means to which a plurality of coupled laser beams are inputted, the pulse beam with a synchronized phase can be stably generated. Particularly, when inputting the plurality of laser beams to the same optical amplifier or the THz wave generator, it is indispensable to synchronize the phases and the configuration of the invention can easily satisfy these conditions.

According to the sixth aspect of the invention, since the pulse generator has a plurality of pulse generating means corresponding to the laser beams and phase controlling means for controlling phases of the pulse beams generated by the pulse generating means, it is possible to easily control the phase of the pulse beams generated by the plurality of pulse generating means, when inputting the plurality of laser beams to the same optical amplifier or the THz wave generator, it is possible to synchronize the phases.

According to the seventh aspect of the invention, since the phase controlling means is any one of a delay circuit of an electric signal applied to the plurality of the pulse generating means and light path controlling means formed in a light path of the pulse beam generated by the pulse generating means, it is possible to easily control the phase by electrical circuits or optical configurations, and the likes.

According to the eighth aspect of the invention, since the plurality of laser beams are formed into the pulse beam and are inputted to the single optical amplifier, one optical amplifier can amplify the plurality of laser beams and the number of expensive optical amplifiers can decrease, for example the THz wave can be easily generated by only inputting an output beam from single optical amplifier to the THz wave generating element with the use of one optical fiber.

According to the ninth aspect of the invention, since the plurality of laser beams are inputted to the optical amplifier with a polarization plane of the laser beams been controlled, for example the rates of amplification of the laser beams can be maintained in high by inputting two kinds of laser beams with orthogonal polarization planes.

According to the tenth aspect of the invention, since the optical amplifier is an erbium-doped fiber amplifier, it is possible to amplify the pulse beams by several tens kW, consequently the several-W THz wave can be efficiently generated.

According to the eleventh aspect of the invention, since the optical amplifier is a polarization-plane-maintaining erbium-doped fiber amplifier, it is easy to control the polarization plane when inputting an output from the optical amplifier.

According to the twelfth aspect of the invention, since the THz wave generating element uses DAST crystals, it is possible to easily generate the THz wave by inputting the plurality of the laser beams having the different wavelengths in the same axis. In addition, since it is possible to be directly inputted from one optical fiber, optical system of the THz wave generator can be simplified According to the thirteenth aspect of the invention, since the wavelength of the laser beam formed into the pulse beam is in the range of 1.55 μm, the inexpensive optical amplifiers can be used in comparison with the optical amplifiers with the high rate of the amplification among the marketed optical amplifiers.

According to the fourteenth aspect of the invention, since pulse width of the pulse beam is 20 ns or less, more preferably 10 ns or less, it is possible to sufficiently perform the amplification function of the optical amplifiers such as the erbium-doped fiber amplifiers, the very high-power THz wave can be generated.

According to the fifteenth aspect of the invention, since light intensity inputted to the optical amplifier at the time of extinguishing the pulse beam is −20 dBm or less, more preferably −30 dBm or less, an energy loss accumulated to the optical amplifier at the time of extinction is restricted and the rate of the amplification can be maintained in high power and stably when the pulse beam was inputted to the optical amplifier.

According to the sixteenth aspect of the invention, since a generating frequency of the pulse beam is 100 kp/s or less, more preferably 20 kp/s or less, intensity of energy accumulated to the optical amplifier at the time of extinction is increased, the rate of the amplification can be maintained in high power and stably when the pulse beam was inputted to the optical amplifier.

BRIEF DESCRIPTION OF THE DRAWINGS

[FIG. 1] is diagram illuminating generation principal of the THz wave.

[FIG. 2] is schematic diagram illuminating THz wave generating apparatus described in patent document 2.

[FIG. 3] is basic conceptual diagram illuminating THz wave generating apparatus according to a present invention.

[FIG. 4] is diagram illuminating the first embodiment according to the present.

[FIG. 5] is diagram illuminating the second embodiment according to the present.

[FIG. 6] is diagram illuminating the third embodiment according to the present.

[FIG. 7] is diagram illuminating the fourth embodiment according to the present.

[FIG. 8] is diagram illuminating the fifth embodiment according to the present.

REFERENCE NUMERALS

A: LIGHT SOURCE
B: MULTI WAVELENGTH GENERATOR
C: WAVELENGTH SELECTING MEANS
D: PULSE GENERATOR
E: OPTICAL AMPLIFIER
F: THz WAVE GENERATING ELEMENT
1: LASER LIGHT SOURCE
2: LIGHT CIRCULATING UNIT HAVING AN SSB MODULATOR
3: FILTER
4: OPTICAL SWITCH
5: EDFA
6: DAST
10: DRIVING SIGNAL
11: DELAY CIRCUIT
12: LIGHT PATH CONTROLLING MEANS
20: POLARIZATION-PLANE-MAINTAINING FIBER

BEST MODE FOR CARRYING OUT THE INVENTION

FIG. 3 is diagram illuminating basic concept of THz wave generating apparatus according to a present invention.

A THz wave generator has a light source A, a multi wavelength generator B, wavelength selecting means C, a pulse generator D, an optical amplifier E, and THz wave generating means F as main configurations. The light source A to the optical amplifier E are means for generating two laser beams having different wavelengths (frequencies $f_0$, $f_n$) inputted to the THz wave generating means F and particularly in the invention, at least one laser beam of a plurality of laser beams having different wavelengths generated by the light source A to the wavelength selecting means C is transformed into a pulse beam by the pulse generator D and is inputted to the optical amplifier E so as to fully utilize an amplification characteristic of the optical amplifier E.

In the light source A, a laser light source which stably generates single wavelength such as single mode laser light source is very properly utilized. The light source A can utilize a variety of light sources such as a semiconductor laser and a gas laser and moreover the wavelengths of the light sources can be adjustably setup by using a variable wavelength laser light source. Further, the light source A can comprise not only one laser light source but also a plurality of light sources having different wavelengths. In this case, the multi wavelength generator B and the wave selecting means C can be omitted.

In addition, in the light source A, since an isolator is disposed on a light path of an outgoing beam not so as to re-input the laser beam to the laser light source or an polarization plane of a light wave which launched from a light source A is arranged, a polarization controller can be disposed in the light path of the laser beam.

A light circulating unit including an SSB optical modulator, a reciprocating multiple modulator, or a DSB-SC modulator can be used in the multi wavelength generator and these can generate a constant beam with a plurality of wavelengths having intervals of regular frequencies or regular wavelengths precisely controlled.

The light circulating unit including the SSB optical modulator is, as shown in Patent Document 2, that the transmitted beam wave forms a light path with a circulated shape and a single side band (Single Side Band, SSB) optical modulator is disposed in the light path of circulation.

As specifically described in Non-Patent Document 1 as mentioned below, the SSB optical modulator operates by applying a microwave from a general signal generator.

For example, when a frequency of the microwave is f, a frequency of the beam inputted to the SSB optical modulator is shifted as well as f. As shown in the FIG. 3, after a frequency $f_0$ of an outputting beam penetrates the SSB optical modulator, the frequency of the outputting beam becomes $f_1=f_0+f$. This outputting beam is called the single side band spectrum.

Like this, the SSB optical modulator operates as a frequency shifter of the beams.

It is possible to shift the frequency of the outputting beam to minus direction like $f_0-f$ by the method adding the microwave to the SSB optical modulator.

[Non-Patent Document 1] Article "Optical SSB-SC Modulator Using X-cut LiNbO$_3$" (Higuma Kaoru and four others, P. 17 to 21, "Sumitomo Osaka Cement technical report 2002", issued by the New Technology Research Center of Sumitomo Osaka Cement Co., Ltd. Dec. 8, 2001)

In the optical circulating portion, the transmitted light wave is setup to accompany with the light path with the shape of the circulation by using optical components such as a waveguide formed in the optical fiber or a substrate, a lens, and a mirror and the SSB optical modulator is disposed on the circulating light path.

In the light circulating unit including the SSB optical modulator, when a frequency of the light wave initially transmitted to the light circulating unit is $f_0$ (zero time circulation), the frequency of the light wave first passing the SSB optical modulator becomes $f_1=f_0+f$ (once circulation). Similarly the second and the third become $f_2=f_0+2f$ and $f_3=f_0+3f$ and the light wave having the plurality of wavelengths can be generated at the same intervals f of the frequency.

In the light circulating unit including the SSB optical modulator, since the light wave having a particular wavelength is continuously supplied from the light source A, the light waves having the plurality of wavelengths simultaneously exist in the light path of the optical circulating portion.

In general, a light intensity of the single side base spectrum generated by the SSB optical modulator declines in comparison with the light wave inputted to the SSB optical modulator. Accordingly, the decline of the light intensity of the single side spectrum is supplemented by disposing the optical amplifier on the circulating light path of the optical circulating portion and the light intensity available as a multi wavelengths light source is ensured.

In addition, an optical filter corresponding to the wavelength of the light wave selected by the wavelength selecting means C can be formed in the circulating light path of the optical circulating portion.

As the range of a penetration wavelength of the optical filter is accorded to the range of wavelength divisible by a division element, the wavelength of the light wave circulating the light circulating unit wave is limited and a noise included to the finally outgoing light wave from the multi wavelength light source can be suppressed without generating the light wave except the range of the necessary wavelength.

Further, an isolator to restrict a light wave re-inputted from reverse direction about the SSB optical modulator or a polarization controller to control the polarization plane of the light wave for increase of the modulation efficiency of the SSB optical modulator can be disposed on the circulating light path of the optical circulating portion.

The reciprocating multiple modulator, as shown in Patent Document 3, can generate the light wave having the interval of the predetermined frequency and having the plurality of the wavelengths by forming a fiber Bragg grating (FBG) on the optical waveguide before divergent and after coupling the waves and by reflecting the light wave among the FBG, so as to interpose a divergent waveguide of the optical modulator having the Mach-Zehnder optical waveguide.

Further, the DSB-SC (Dual Side Band with Suppressed Carrier) modulator, as shown in Patent Document 4, is the modulator outputting only two light waves having the frequencies $f_0+f$ which add the modulation frequency f to the frequency $f_0$ of the light wave inputted to the optical modulator by using the Mach-Zehnder optical modulator.

[Patent Document 3] Japanese Patent No. 3404528

[Patent Document 4] Hiroyuki Furuta, et al., "Optical Injection Locking of a 38-GHz-Band InP-Based HEMT Oscillator Using a 1.55 μm DSB-SC Modulated Lightwave", IEEE MICROWAVE AND WIRELESS COMPONENTS LETTERS, Vol. 11, No. 01, January 2001

Next, the wavelength selecting means will be described.

A role of the wavelength selecting means is to select the laser beam having the particular wavelength among the plurality of laser beams having the different wavelengths outgoing from the multi wavelength generator B.

The wavelength selecting means is particularly not limited when it can select the particular wavelength such as a dielectric film filter formed of a dielectric film and an optical fiber Bragg grating (FBG). The wavelength selecting means can use what the selected wavelength is fixed, but a variable type which can select any wavelength can be used such as an etalon and a diffraction grad.

The pulse wave generator D is not particularly limited when it can change the intensity of the light wave such as an optical switch or the optical modulator, but it is preferable to generate a high-speed and stable pulse beam suitable for the characteristic of the optical amplifier. In the aspect that the optical switch or the optical modulator is driven by an electric signal and is capable of high-speed operation, the THz wave generator according to the invention is very properly used.

In the optical amplifier, an erbium-dope fiber amplifier (EDFA) can be properly used. When the EDFA is the pulse beam (about several mW) in the range of 1.55 µm, it is possible to be amplified by several tens kW and the several-W THz wave is efficiently generated by being used in the THz wave generator of the invention.

Further, in the invention, it is necessary that pulse width of the pulse beam is 20 ns or less, and more preferably 10 ns or less and that light intensity inputted to the optical amplifier at the time of extinction is −20 dBm or less, more preferably −30 dBm or less, so as to stably and sufficiently perform the amplification function of the optical amplifiers such as the EDFA.

It is difficult that the power from the optical amplifier is maintained in high-power and stably when the pulse width is over 20 ns and energy loss accumulated to the optical amplifier increases at the time of extinction when the incident light intensity at the time of the extinguishing the pulse beam is over −20 dBm and it is difficult to sufficiently perform the amplification function when the pulse beam is inputted.

A generating frequency of the pulse beam is 100 kp/s (kilo-pulse per second) or less, more preferably 20 kp/s or less to sufficiently ensure the time of the extinction and the rate of the amplification can be maintained in a high power and stably when the pulse beam was inputted to the optical amplifier by increasing quantity of energy accumulated to the optical amplifier.

Further, when the output from the optical amplifier is inputted to the THz wave generating element by using the erbium-doped fiber amplifier of a polarization-plane-maintaining type, the polarization plane can be easily controlled since the polarization plane controlling means such as a polarizer is not necessary.

The THz wave generating element, as above-described, can properly use the THz wave generating element using generation of the differential frequency. Specifically, nonlinear optical crystals by such as $LiBO_3$, GaAS, and dielectric DAST are used.

The operation of the THz wave generating element, as shown in FIG. 1(a), is to generate the THz wave having frequencies corresponding to frequency differences between the two light waves having the different frequencies by inputting the two light waves to the nonlinear optical crystal. According to the THz wave generating element, since it is possible to directly input the plurality of the laser beams having the different wavelengths in the same axis with using one optical fiber, the optical system of the THz wave generator can be more simplified.

Since the all of the light source A, the multi wave generator B, the wavelength selecting means C, the pulse generator D, optical amplifier E, and the THz wave generating element F can be optically interconnected with using the optical fiber, the entirety of the THz wave generator can be miniaturized and is strong against disturbance and can be stably operated.

Further, it is possible to reduce the number of optical units by sharing an optical coupler, which couples the light source A and the light circulating unit of the multi wave generator B, and an optical coupler which couples the light circulating unit and the wavelength selecting means C. An optical fiber coupler or combination of an optical circulator and an optical fiber Bragg grating can be applied in these optical couplers.

Considering that the part which greatly affects the power of the THz wave generated by the THz wave generator of the invention is the optical amplifier, in the aspect that the comparatively inexpensive and small-sized EDFA is marketed relative to the pulse beam in the range of 1.55 µm, it is preferable to select the parts such as the light source A, the multi wavelength generator B, the wavelength selecting means C, the pulse generator D, the optical amplifier E, and the THz wave generating means F to use the laser beam in the range of 1.55 µm. Thereby, manufacturing cost of the apparatus can decrease and the entirety of the apparatus can be compact.

Next, basic operation of the THz wave generator will be described.

The light wave (frequency $F_0$) outgoing from the light source A is inputted to the multi wavelength generator B and the plurality of laser beams having different wavelengths (frequencies $f_0, f_1, f_2, \ldots f_n \ldots$) outgoing from the multi wavelength generator B are generated. The laser beam having particular wavelength (frequencies $f_0, f_n$) among the light waves outgoing from the multi wavelength generator B is selected by the wavelength selecting means C.

The laser beam with the particular wavelength is formed into the pulse beam by the pulse generator D and is inputted to the optical amplifier E and is amplified with synchronizing the phase of the pulse beam. The two amplified pulse beams (frequency $f_0, f_n$) are inputted to the THz wave generating element F and the pulse-shaped light wave (THz wave) having the same frequency ($f_T = f_n - f_0$) about the difference of the frequency of two light waves is outgoing from the THz wave generating element F. In the differential frequency generating the THz wave generating element, since the intensity of the output THz wave is proportional to multiplication of each intensity of the two light waves having different frequencies and inputted to the THz wave generating element, the light intensity of the output THz wave can be greatly enhanced by amplifying both of the intensity of two light waves.

Hereinafter, various embodiments of the THz wave generator according to the invention will be described.

In the description below, examples using single mode laser light source (LD), as the light source A, the light circulating unit having the SSB optical modulator as the multi wavelength generator B, the filter (Filter) as the wavelength selecting means C, the optical switch (SW) as the pulse generator D, the erbium-doped fiber amplifier (EDFA) as the optical amplifier E, and the DAST crystals (DAST) as the THz wave generating means F are described, but it is surely possible to replace the parts with another known art as above-described.

FIG. 4 shows the first embodiment according to the THz wave generator of the invention.

In the first embodiment, an outgoing beam from a laser light source (LD) 1 is transformed into a multi wavelength laser beam by a light circulating unit 2 including an SSB optical modulator and the light waves with two particular wavelengths are selected by a filter 3. The two selected light waves are formed into the pulse beams with a same phase by an optical switch (SW) 4 and are injected to an erbium-doped fiber-amplifier (EDFA) 5.

The two pulse beams having the different wavelengths amplified by the EDFA generate the THz wave ($f_t$) by being inputted to DAST crystals (DAST) 6. Since the light wave inputted to the DAST needs to control a polarization plane, a polarizer is disposed between the EDFA 5 and the DAST 6.

FIG. 5 shows the second embodiment according to the THz wave generator of the invention.

The outgoing light wave from the LD 1 is divided into two beams and the one light wave (frequency $f_0$) is directly inputted to the DAST 6. The other light wave same as the first embodiment is transformed into the light wave having the frequency $f_0$ and the different wavelengths (frequency $f_n$) by the light circulating unit 2 including the SSB optical modulator and the filter 3 and is formed into the pulse beam by SW 4 and then is amplified by EDFA 5.

The light wave (frequency $f_0$) inputted directly from the LD 1 and the pulse beam (frequency $f_n$) amplified by the EDFA 5 are inputted to the DAST 6 after adjusting the polarization plane with being coupled.

The light wave with the frequency $f_0$ is the constant beam and the light wave with the frequency $f_n$ is pulse beam but it is possible to generate the THz wave on the pulse in the DAST 6.

In addition, the light wave with frequency $f_0$ in the second embodiment is not generated by being divided from the LD 1 but it is possible to provide another laser light source different from the LD 1. It is possible that the amplified light wave is injected to the DAST 6 by interposing the optical amplifier also about the light wave with the frequency $f_0$ as necessary.

FIG. 6 shows the third embodiment according to the THz wave generator of the invention.

The third embodiment is equal to the second embodiment until two beams of the frequency $f_0$ and $f_n$ are generated but since the two light waves are amplified, the two light waves are coupled and formed into the pulse beam by the SW 4 and amplified by the EDFA 5. The SW or the EDFA can be applied in the the light waves but it is preferable that the two are shared so as to reduce the number of the parts.

As the third embodiment, so as to form the two light waves having the different wavelengths into the pulse beam by the same pulse generator, it is needed to apply a method that a switching characteristic do not depend on the length of the light wave. For example, the marketed Mach-Zehnder interference high-speed optical modulator for the optical digital communication as the modulator with high-speed (generating the pulse of below the 10 ns) can be used. From a point of view of high-extinction ratio, it is preferable to use the high-extinction ratio modulator as shown in Patent Document 5.

Further, when two light waves are amplified by the single EDFA, declination easily occurs in the rate of amplification of the light waves. In order to solve the problem, the two light waves are inputted to the polarization-plane-maintaining fiber EDFA in the state of the same polarization or the orthogonal polarization.

[Patent Document 5] Higuma Kaoru et al., "Wavelength characteristic of high-extinction ratio modulator applying an optical FSK modulator" IEICE, 2005 Society (Hokkaido University) Collected Paper C-3-2

FIG. 7 shows the forth embodiment according to the THz wave generator of the invention.

The forth embodiment shows that the each pulse beam is formed into the pulse beam respectively after generating the two light waves, as the third embodiment. A method for generating the two light waves is not limited to the third embodiment and various methods such as a method using the two laser light source generating light wave with the different wavelengths or a method taking out the light wave, which has the particular wavelength among the plurality of light waves outputting from the multi wavelength generator, to the different light paths can be used.

In order to inject the two light waves (frequencies $f_0$ and $f_n$) to the single EDFA 5 with being formed respectively into the pulses, it is necessary to synchronize the phases of the pulsed light waves P ($f_0$) and P ($f_n$). In a method for synchronizing the phases of the pulse beams, as FIG. 7(a), there is a method forming a delay circuit 11 at one part of a signal circuit of a driving signal 10 driving the SWs to synchronize driving times of the optical switches (SW) 4, 4'.

In another method for synchronizing the phases, as FIG. 7(b), there is also a method forming light path controlling means 12 on any one of the light paths of the pulsed light wave P ($f_0$) and P ($f_n$) by the SW. The light path controlling means can use various instruments such as control of the optical fiber length or insertion of optical elements delaying the light wave like a ½ wavelength plate.

FIG. 8 shows the fifth embodiment according to the THz wave generator of the invention.

The fifth embodiment shows an application example of a method for injecting the two pulsed light waves P ($f_0$) and P ($f_n$) to the DAST 6. In FIG. 8(a), it is shown as method that the EDFA is form to each light wave and the amplified pulse beams are coupled by an optical coupler and then are injected to the DAST 6.

Further, in FIG. 8(b), same as the forth embodiment (FIG. 7), it is shown as a method that the two pulsed light waves P ($f_0$) and P ($f_n$) are coupled and injected to the EDFA.

In a method of FIG. 8(b), for example, the polarization planes of the two light waves are previously adjusted in orthogonal and the two light waves are injected to the EDFA 5 by using the polarization-plane-maintaining fiber 20, thereby it is possible to adjust the rate of the amplification of two light waves in the same rate in the EDFA. Only, since it is necessary to match the two polarization planes in the DAST 6, the polarization plane controlling means needs to be disposed between the EDFA 5 and DAST 6. As the polarization controlling means, there is a method dividing polarizing and circulating one beam, which is divided by the optical filter, by the wavelength plate or a method using a narrowband polarization controller as Patent Document 6.

[Patent Document 6] R. C. Alferness, et al., "Electro-optic waveguide TE←→TM mode converter with low drive voltage", OPTICS LETTERS, Vol. 5, No. 11, November 1980

INDUSTRIAL APPLICABILITY

As described above, according to the present invention, it is possible to provide a THz wave generator which can suppress the increase in manufacturing cost or the increase in size of the apparatus and which can efficiently generate the several-W THz wave.

The invention claimed is:

1. A THz wave generator for generating a THz wave from a THz wave generating element by inputting a plurality of laser beams having different wavelengths to the THz wave generating element,
   wherein all of the plurality of laser beams are formed into a pulse beam, and
   wherein the pulse beam is amplified by a single optical amplifier to which the laser beams are inputted with polarization planes of laser beams being controlled, and then the pulse beam is inputted to the THz wave generating element.

2. The THz wave generator according to claim 1, wherein the plurality of laser beams having different wavelengths are generated by inputting a single wavelength beam from a single mode laser light source to a multi wavelength generator and by inputting light waves having a plurality of wavelengths generated from the multi wavelength generator to wavelength selecting means.

3. The THz wave generator according to claim 2, wherein the pulse beam is generated by a pulse generator comprising one of an optical switch and an optical modulator.

4. The THz wave generator according to claim 2, wherein the multi wavelength generator uses any one of a light circulating unit comprising an SSB optical modulator, a reciprocating multiple modulator, and a DSB-SC modulator.

5. The THz wave generator according to claim 4, wherein the pulse beam is generated by a pulse generator comprising one of an optical switch and an optical modulator.

6. The THz wave generator according to claim 1, wherein the pulse beam is generated by a pulse generator comprising one of an optical switch and an optical modulator.

7. The THz wave generator according to claim 6, wherein the pulse generator comprises single pulse generating means to which a plurality of coupled laser beams are inputted.

8. The THz wave generator according to claim 6, wherein the pulse generator comprises a plurality of pulse generating means corresponding to laser beam and phase controlling means for controlling phases of the pulse beams generated by the pulse generating means.

9. The THz wave generator according to claim 8, wherein the phase controlling means is any one of a delay circuit of an electric signal applied to the plurality of pulse generating means, and light path controlling means formed in a light path of the pulse beam generated by the pulse generating means.

10. The THz wave generator according to claim 1, wherein the single optical amplifier is an erbium-doped fiber amplifier.

11. The THz wave generator according to claim 10, wherein the single optical amplifier is a polarization-plane-maintaining erbium-doped fiber amplifier.

12. The THz wave generator according to claim 1, wherein the THz wave generating element uses DAST crystals.

13. The THz wave generator according to claim 1, wherein the wavelength of the laser beam formed into the pulse beam is 1.55 μm.

14. The THz wave generator according to claim 1, wherein pulse width of the pulse beam is 20 ns or less.

15. The THz wave generator according to claim 1, wherein light intensity inputted to the single optical amplifier at a time of extinguishing the pulse beam is −20 dBm or less.

16. The THz wave generating apparatus according claim 1, wherein a generating frequency of the pulse beam is 100 kp/s or less.

* * * * *